(12) United States Patent
Herring et al.

(10) Patent No.: US 11,135,765 B2
(45) Date of Patent: Oct. 5, 2021

(54) SERIALLY CURABLE RESINS USEFUL IN ADDITIVE MANUFACTURING

(71) Applicant: Carbon, Inc., Redwood City, CA (US)

(72) Inventors: Marie K. Herring, Palo Alto, CA (US); Matthew S. Menyo, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 354 days.

(21) Appl. No.: 16/018,260

(22) Filed: Jun. 26, 2018

(65) Prior Publication Data

US 2019/0047211 A1    Feb. 14, 2019

Related U.S. Application Data

(60) Provisional application No. 62/544,052, filed on Aug. 11, 2017.

(51) Int. Cl.

| | |
|---|---|
| *B29C 64/129* | (2017.01) |
| *B33Y 10/00* | (2015.01) |
| *B33Y 70/00* | (2020.01) |
| *B29C 64/295* | (2017.01) |
| *B29C 35/08* | (2006.01) |
| *B29K 105/00* | (2006.01) |
| *B29K 105/16* | (2006.01) |
| *B29K 75/00* | (2006.01) |

(52) U.S. Cl.
CPC ............ *B29C 64/129* (2017.08); *B33Y 10/00* (2014.12); *B33Y 70/00* (2014.12); *B29C 64/295* (2017.08); *B29C 2035/0855* (2013.01); *B29K 2075/00* (2013.01); *B29K 2105/0002* (2013.01); *B29K 2105/16* (2013.01)

(58) Field of Classification Search
None
See application file for complete search history.

(56) References Cited

U.S. PATENT DOCUMENTS

| | | | |
|---|---|---|---|
| 3,213,058 A | 10/1965 | Boyle et al. | |
| 4,785,075 A | 11/1988 | Shimp | |
| 5,236,637 A | 8/1993 | Hull | |
| 5,264,572 A | 11/1993 | Endo et al. | |
| 5,391,072 A | 2/1995 | Lawton et al. | |
| 5,529,473 A | 6/1996 | Lawton et al. | |
| 6,861,475 B2 | 3/2005 | Ilenda et al. | |
| 6,916,867 B2 | 7/2005 | Gugumus | |
| 7,157,586 B2 | 1/2007 | Wood et al. | |
| 7,438,846 B2 | 10/2008 | John | |
| 7,625,977 B2 | 12/2009 | Lutz et al. | |
| 7,642,316 B2 | 1/2010 | Rego et al. | |
| 7,695,643 B2 | 4/2010 | Fritzsche et al. | |
| 7,892,474 B2 | 2/2011 | Shkolnik et al. | |
| 8,088,245 B2 | 1/2012 | Lutz et al. | |
| 8,110,135 B2 | 2/2012 | El-Siblani | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 2013/0292862 A1 | 11/2013 | Joyce | |
| 2013/0295212 A1 | 11/2013 | Chen et al. | |
| 2015/0184039 A1 | 7/2015 | Lutz et al. | |
| 2015/0215430 A1 | 7/2015 | Votour | |
| 2015/0240113 A1 | 8/2015 | Pratt et al. | |
| 2016/0160077 A1* | 6/2016 | Rolland | C08G 18/4825 428/36.9 |
| 2018/0244854 A1* | 8/2018 | Drazba | C08G 77/12 |
| 2018/0304526 A1* | 10/2018 | Feller | B29C 64/379 |
| 2019/0322785 A1* | 10/2019 | Menyo | C08L 81/06 |

FOREIGN PATENT DOCUMENTS

| | | |
|---|---|---|
| WO | 2015/164234 | 10/2015 |
| WO | 2016/133759 | 8/2016 |
| WO | 2016/145182 | 9/2016 |

OTHER PUBLICATIONS

Janusziewcz et al. "Layerless fabrication with continuous liquid interface production" Proceedings of the National Academy of Sciences USA, 113(42):11703-11708 (2016).
Tubleston et al "Continuous liquid interface production of 3D objects" Science, 347(6228):1349-1352 (2015).
Gandini, A. "The furan/maleimide Diels—Alder reaction: A versatile click—unclick tool in macromolecular synthesis" Progress in Polymer Science, 38(1):1-29 (2013). Abstract.

* cited by examiner

*Primary Examiner* — Mark A Osele
*Assistant Examiner* — Evan T Hulting
(74) *Attorney, Agent, or Firm* — Myers Bigel, P.A

(57) ABSTRACT

Provided is a method of forming a three-dimensional object, which may include the steps of: (a) providing a carrier and an optically transparent member having a build surface, the carrier and the build surface defining a build region therebetween; (b) filling the build region with a polymerizable liquid that comprises a reactive blocked monomer and/or prepolymer comprising a self-polymerizing monomer and/or prepolymer blocked with a light-polymerizable blocking group; (c) irradiating the build region with light through said optically transparent member to form a solid polymer scaffold from the reactive blocked monomer and/or prepolymer and also advancing the carrier away from the build surface to form a three-dimensional intermediate; and then (d) heating and/or microwave irradiating, the three-dimensional intermediate sufficiently to degrade the scaffold and regenerate the monomer and/or prepolymer in de-blocked form, which monomer and/or prepolymer in turn self-polymerize, to form said three-dimensional object.

11 Claims, No Drawings

SERIALLY CURABLE RESINS USEFUL IN ADDITIVE MANUFACTURING

FIELD OF THE INVENTION

The present invention concerns additive manufacturing in general, and particularly concerns resins useful in methods such as stereolithography and continuous liquid interface production (CLIP).

BACKGROUND OF THE INVENTION

In conventional additive manufacturing techniques (often referred to as "3D printing"), construction of a three-dimensional object is performed in a step-wise or layer-by-layer manner by sequentially exposing a light-polymerizable resin to patterned light.

Generally referred to as "stereolithography," numerous examples are known, including those described in U.S. Pat. No. 5,236,637 to Hull (see, e.g., FIGS. 3-4) and U.S. Pat. No. 7,892,474 to Shkolnik. Additional examples are given in U.S. Pat. Nos. 5,391,072 and 5,529,473 to Lawton, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al.

Unfortunately, additive manufacturing techniques have generally been slow, and have long been known to produce parts with a limited range of mechanical properties, frequently rendering such products unsuitable for real world use beyond simple prototyping.

More recently, techniques referred to as "continuous liquid interface production" (or "CLIP") have been developed. These techniques enable the rapid production of three-dimensional objects, preferably in a layerless manner, by which the parts may have desirable structural and mechanical properties. See, e.g., J. DeSimone et al., U.S. Pat. Nos. 9,211,678; 9,205,601; and 9,216,546; J. Tumbleston, et al., *Continuous liquid interface production of 3D Objects*, Science 347, 1349-1352 (2015), and R. Janusziewcz et al., *Layerless fabrication with continuous liquid interface production*, Proc. Natl. Acad. Sci. USA 113, 11703-11708 (2016).

The speed, and other attributes, of CLIP in turn opened the door to the development of "dual cure" stereolithography resins, in which the shape of an article is created by light polymerization in the additive manufacturing process, and the mechanical properties of the article are created in a second cure that typically follows (for example, by baking). Dual cure resins that provide for a range of mechanical properties in the final product are described in, for example, J. Rolland et al., U.S. Pat. Nos. 9,453,142, 9,598,606 and 9,676,963 and US Patent Application Publication No. 2016/0160077.

The requirements imposed on a light polymerizable resin during the different steps of a dual cure additive manufacturing process can, however, compete with one another. For example, ingredients that provide for a liquid resin that is readily processed by additive manufacturing to produce an intermediate "green" part (e.g., low viscosity) may be detrimental to producing a reasonably strong "green" part. Ingredients that might provide for a strong green part may be detrimental to the mechanical properties of the finished part after a second cure such as a baking step. And, ingredients that might provide for rapid light polymerization may also be detrimental to "green" strength, and/or the mechanical properties of the finished object. Accordingly, there is a need for additional resin systems for use in dual cure additive manufacturing.

SUMMARY OF THE INVENTION

A first aspect of the invention is a method of forming a three-dimensional object, including the steps of:

(a) providing a carrier and an optically transparent member having a build surface, the carrier and the build surface defining a build region therebetween;

(b) filling the build region with a polymerizable liquid, the polymerizable liquid comprising a reactive blocked monomer and/or prepolymer, the reactive blocked monomer and/or prepolymer comprising a self-polymerizing monomer and/or prepolymer blocked with a light-polymerizable blocking group;

(c) irradiating the build region with light through said optically transparent member to form a solid polymer scaffold from the reactive blocked monomer and/or prepolymer and also advancing the carrier away from the build surface to form a three-dimensional intermediate having the same shape as, or a shape to be imparted to, said three-dimensional object; and then (d) heating, microwave irradiating, or both heating and microwave irradiating, the three-dimensional intermediate sufficiently to degrade the scaffold and regenerate the monomer and/or prepolymer in de-blocked form, which monomer and/or prepolymer in turn self-polymerize, to form said three-dimensional object.

In some embodiments, a goal of the invention is to provide resins and methods that produce finished objects with satisfactory rigidity.

In some embodiments, a goal of the invention is to provide resins and methods that produce finished objects with good thermal stability.

In some embodiments, a goal of the invention is to provide resins and methods that produce finished objects with good flame resistance.

In some embodiments, a goal of the invention is to provide resins and methods that reduce out-gassing of solvents and/or degradation products during baking of an intermediate "green" part.

In some embodiments, a goal of the invention is to provide resins and methods that relieve stresses in the light-fabricated parts by cleaving out a mid-block of the light-polymerized scaffold during subsequent cure.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying examples, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art, as well as specific examples thereof.

As used herein, "t-BAEMA" and "TB" refer to 2-(tert-Butylamino)ethyl methacrylate; "IPDI" refers to isophorone diisocyanate; "ABPU" refers to UV-curable (meth)acrylate blocked polyurethane; "PTMO" refers to polytetramethylene oxide; and "TPO" refers to diphenyl(2,4,6-trimethylbenzoyl)phosphine oxide.

1. Polymerizable Liquids (Resins).

Reactive blocked monomers and/or prepolymers, and resins containing the same, can be produced in accordance with known techniques, or variations thereof that will be apparent to those skilled in the art based on the present disclosure (see, e.g., J. Rolland et al., U.S. Pat. Nos. 9,453,142, 9,598,606 and 9,676,963 and US Patent Application Publication No. 2016/0160077).

Resins for Isocyanurate Formation.

A resin for forming, by homopolymerization, an isocyanurate polymer, is prepared by mixing the following ingredients:

(i) A short-chain reactive blocked isocyanate with 2 or more blocked isocyanate groups, for example, toluene-2,4,6-triyl-triisocyanate blocked with t-BAEMA, or triphenylmethane triisocyanate blocked with t-BAEMA, or isophorene diisocyanate blocked with t-BAEMA, or ethyl ester L-lysine triisocyanate blocked with t-BAEMA;

(ii) Optionally, a long-chain reactive blocked isocyanate with 2 or more blocked isocyanate groups, for example TB-IPDI-PTMO-IPDI-TB;

(iii) An isocyanate trimerization catalyst (as discussed below);

(iv) a photoinitiator;

(v) optionally, but in some embodiments preferably, a light absorbing pigment or dye;

(vi) optionally, a diluent; and (vii) optionally, a filler.

Isocyanate trimerization catalysts useful in the present invention (that is, catalysts that promote the formation of isocyanurates from isocyanates) are known. Examples include, but are not limited to, potassium acetate and a tertiary amine, or cesium fluoride, or a metal salt of a carboxylic acid (see, e.g., U.S. Pat. No. 5,264,572). One particular example is DABCO® TMR tertiary amine catalyst (available from Evonik Nutrition & Care GmbH Goldschmidtstraße 100 45127 Essen, Germany).

Resins Containing Diels-Alder Adducts.

Resins for forming, by homopolymerization, a poly(maleimide) polymer, are prepared by mixing the following ingredients:

(i) a Diels-Alder adduct (as discussed below);

(ii) a photoinitiator;

(v) optionally, but in some embodiments preferably, a light absorbing pigment or dye;

(vi) optionally, a diluent; and (vii) optionally, a filler.

Diels-Alder adducts used in the present invention are, in general, compounds of Formula I:

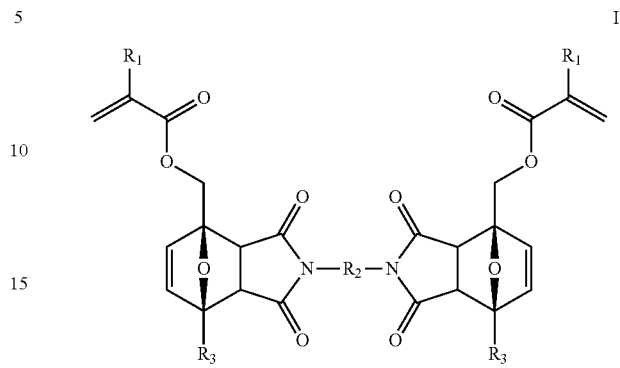

where $R_1$ and $R_3$ are each independently H or $CH_3$, and $R_2$ is a linking group. Compounds of Formula I can be produced by reacting a furan of Formula II:

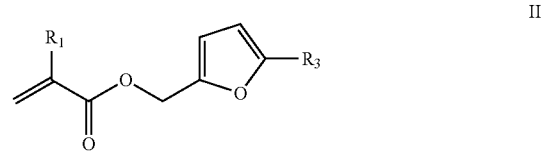

where $R_1$ and $R_3$ are as given above, with a bis-maleimide compound of Formula III:

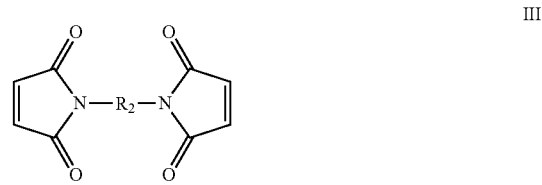

Where $R_2$ is as given above, in a Diels-Alder reaction, to give the compound of Formula I. The Diels-Alder reaction may be carried out in accordance with known techniques (see, e.g., A. Gandini, *The furan/maleimide Diels-Alder reaction: A versatile click-unclick tool in macromolecular synthesis*, Progress in Polymer Science 38, 1-29 (January 2013)) or variations thereof that will be apparent to those skilled in the art.

"Linking group" as used herein may be any suitable inorganic or organic group, such as an aliphatic, aromatic, or mixed aromatic and aliphatic group, that covalently couples two terminal groups—in this case, two maleimide groups. Linking groups may be substituted or unsubstituted (e.g., with halo such as chloro or fluoro, C1-C4 alkoxy, hydroxy, etc.), and may optionally contain hetero atoms (e.g., one, two, three or more selected from N, O, S, etc). Examples of suitable linking groups include, but are not limited to:

—$(CH_2)_{1-8}$— (e.g., —$CH_2$—, —$CH_2CH_2$—, etc.);
—$CH_2CH_2C_6F_{12}CH_2CH_2$—;
—$C_6H_4$— (2 isomers);
—$C_6H_4$—O—$C_6H_4$—;
—$C_6H_4$—$CH_2$—$C_6H_4$—;
—$C_6H_4$—O—$C_6H_4$—O—$C_6H_4$— (2 isomers);

—$C_6H_4$—O—$C_6H_4$—$C(CH_3)_2$—$C_6H_4$—O—$C_6H_4$—;
—$C_6H_4$—O—$C_6H_4$—$C(CF_3)_2$—$C_6H_4$—O—$C_6H_4$—;
—$C_6H_3CF_3$—O—$C_6H_4$—$C(CF_3)_2$—$C_6H_4$—O—$C_6H_3CF_3$—;
—$C_6H_4$—O—$C_6H_4$—(C=O)—$C_6H_4$—O—$C_6H_4$—;
—$C_6H_4$—S—$C_6H_4$—$C(CH_3)_2$—$C_6H_4$—S—$C_6H_4$—;
—$C_6H_4$—$S(=O)_2$—$C_6H_4$—;
—4-methyl-1,3-phenylene bismaleimide;
—3,3'-dimethyl-5,5'-diethyl-4,4'-diphenylmethane bismaleimide;
—O—; and
—O—$C_6H_4$—$C(CH_3)_2$—$C_6H_4$—O—.

Additional Resin Ingredients.

Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides such as diphenyl(2,4,6-trimethylbenzoyl)phosphine oxide (TPO), phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 μm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic Diluents.

In some embodiments, diluents for use in the present invention are preferably reactive organic diluents: That is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, N,N-dimethylacrylamide, N-vinyl-2-pyrrolidone, and N-vinyl formamide, or a mixture thereof. The diluent may be included in the polymerizable liquid in any suitable amount, typically from 1, 5 or 10 percent by weight, up to about 30 or 40 percent by weight, or more.

2. Methods of Use in Additive Manufacturing.

Polymerizable liquids or resins as described herein are used to make three-dimensional objects in a first "light" cure (typically by additive manufacturing) which generates a "green" intermediate object, followed by a second heat cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entireties.

In some embodiments, the intermediate object is formed by continuous liquid interface production (CLIP). CLIP is known and described in, for example, PCT Applications Nos. PCT/US2014/015486 (published as U.S. Pat. No. 9,211,678); PCT/US2014/015506 (also published as U.S. Pat. No. 9,205,601), PCT/US2014/015497 (also published as U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Janusziewcz et al., Layerless fabrication with continuous liquid interface production, *Proc. Natl. Acad. Sci. USA* 113, 11703-11708 (2016). In some embodiments, CLIP employs features of a bottom-up three dimensional fabrication as described above, but the irradiating and/or advancing steps are carried out while also concurrently maintaining a stable or persistent liquid interface between the growing object and the build surface or window, such as by: (i) continuously maintaining a dead zone of polymerizable liquid in contact with the build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234), generating oxygen as an inhibitor by electrolysis (see I Craven et al., WO 2016/133759), and incorporating magnetically positionable particles to which the photoactivator is coupled into the polymerizable liquid (see J. Rolland, WO 2016/145182).

After the intermediate three-dimensional object is formed, it is optionally washed, optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

Heating may be active heating (e.g., in an oven, such as an electric, gas, solar oven or microwave oven, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

The present invention is explained in greater detail in the following non-limiting examples.

Example 1

Serially Curable Resins for Isocyanurate Formation

A serially curable resin composition is prepared by mixing the ingredients described in Table 1 below.

TABLE 1

| Component | Amount |
| --- | --- |
| ABPU-8 (2 kilodalton PTMO reactive blocked isocyanate) | 20.0 g |
| Ethyl Ester L-lysine triisocyanate blocked with t-BAEMA | 77.385 g |
| DABCO ® TMR tertiary amine isocyanate trimerization catalyst | 2.0 g |
| TPO photoinitiator | 0.5 g |
| Black pigment (Sun Chemical) | 0.115 g |
| Total: | 100 g |

Example 2

Production of Three-Dimensional Object

A three-dimensional object, such as a lattice structure, is produced by loading a resin as described in Example 1 above into a Carbon, Inc. M1 or M2 apparatus (available from Carbon Inc. 1089 Mills Way, Redwood City, Calif. 94063 USA), producing an intermediate "green" part, washing the green part in a suitable solvent, and then baking the part in a batch oven (e.g., for a time of 2 to 4 or 6 hours, at an oven temperature of 100 to 150 or 200° C.).

For the resin of Example 1, the first cure is accomplished in the M1 or M2 apparatus, where the UV light causes crosslinking of the reactive acrylate groups. The second cure is accomplished by heating during the bake step, causing deblocking of the isocyanates and formation of isocyanurates (cyclic trimers). The resulting material from which the object is formed includes an interpenetrating network of poly-t-BAEMA and an isocyanurate polyurethane.

Example 3

Serially Curable Resins Containing Diels-Alder Adducts

A Diels-Alder furan/maleimide adduct is prepared as the reaction product of BMI-1400 and furfuryl methacrylate, heated to 60° C. for 12 hours. BMI-1400 is an amorphous, low molecular weight bismaleimide oligomer commercially available from Designer Molecules Inc. (10080 Willow Creek Rd., San Diego, Calif. 92131 USA), and has the following structure:

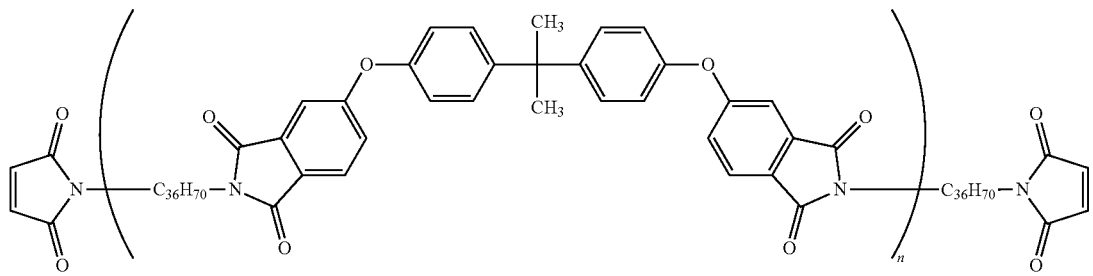

Where n = 1 to 10

A serial dual cure resin is prepared from an adduct as described above by mixing the ingredients set forth in Table 2 below.

TABLE 2

| Component | Amount (g) |
| --- | --- |
| Diels-Alder furan/maleimide adduct | 80 |
| N,N-dimethylacrylamide diluent | 20 |
| TPO photoinitiator | 0.8 |

The resin described in Table 2 is used to produce a three-dimensional object in like manner as set forth in Example 2 above.

The foregoing is illustrative of the present invention, and is not to be construed as limiting thereof. The invention is defined by the following claims, with equivalents of the claims to be included therein.

We claim:

1. A method of forming a three-dimensional object, comprising:
   (a) providing a carrier and an optically transparent member having a build surface, said carrier and said build surface defining a build region therebetween;
   (b) filling said build region with a polymerizable liquid, said polymerizable liquid comprising a reactive blocked monomer and/or prepolymer, said reactive blocked monomer and/or prepolymer comprising a self-polymerizing monomer and/or prepolymer blocked with a light-polymerizable blocking group;
   (c) irradiating said build region with light through said optically transparent member to form a solid polymer scaffold from said reactive blocked monomer and/or prepolymer and also advancing said carrier away from said build surface to form a three-dimensional intermediate having the same shape as, or a shape to be imparted to, said three-dimensional object; and then
   (d) heating, microwave irradiating, or both heating and microwave irradiating, said three-dimensional intermediate sufficiently to degrade said scaffold and regenerate said monomer and/or prepolymer in de-blocked form, which monomer and/or prepolymer in turn self-polymerize, to form said three-dimensional object,
   wherein said reactive blocked monomer and/or prepolymer comprise a Diels-Alder adduct of a maleimide, and said monomer and/or prepolymer in de-blocked form self-polymerize by homopolymerization of said maleimide.

2. The method of claim 1, wherein said light-polymerizable blocking group is selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, vinyl ethers, and combinations thereof.

3. The method of claim 1, wherein said polymerizable liquid further comprises at least one photoinitiator.

4. The method of claim 1, wherein said polymerizable liquid further comprises at least one light-absorbing pigment or dye.

5. The method of claim 1, wherein said polymerizable liquid further comprises at least one filler.

6. The method of claim 1, wherein said Diels-Alder adduct has a structure of Formula I:

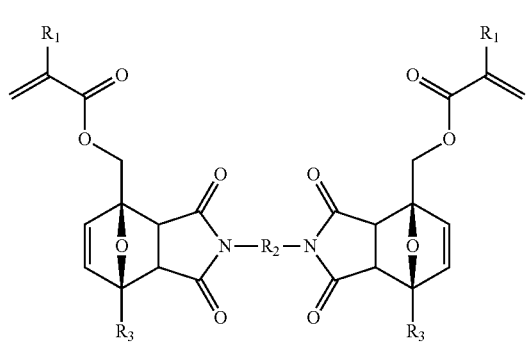

where $R_1$ and $R_3$ are each independently H or $CH_3$, and $R_2$ is a covalent linking group.

7. The method of claim 1, wherein said three-dimensional object comprises a polymer blend, an interpenetrating polymer network, a semi-interpenetrating polymer network, or a sequential interpenetrating polymer network).

8. The method of claim 1, wherein said irradiating and/or said advancing steps are carried out while also concurrently: (i) continuously maintaining a dead zone of said polymerizable liquid in contact with said build surface, and (ii) continuously maintaining a gradient of polymerization zone between said dead zone and said solid polymer scaffold and in contact with each thereof, said gradient of polymerization zone comprising said reactive blocked monomer and/or prepolymer in partially cured form.

9. The method of claim 8, wherein said optically transparent member comprises a semipermeable member, and said continuously maintaining said dead zone is carried out by feeding an inhibitor of polymerization through said optically transparent member, thereby creating a gradient of inhibitor in said dead zone and optionally in at least a portion of said gradient of polymerization zone.

10. The method of claim 9, wherein said inhibitor of polymerization is oxygen.

11. The method of claim 9, wherein said optically transparent member comprises a fluoropolymer.

* * * * *